United States Patent [19]

Canniff et al.

[11] Patent Number: 4,460,806

[45] Date of Patent: Jul. 17, 1984

[54] DUAL TONE MULTIFREQUENCY AND DIAL PULSE RECEIVER

[75] Inventors: Ronald J. Canniff; Gordon K. Lin, both of Naperville, Ill.

[73] Assignee: AT&T Bell Laboratories, Murray Hill, N.J.

[21] Appl. No.: 377,574

[22] Filed: May 13, 1982

[51] Int. Cl.³ .......................... H04J 3/12; H04Q 3/54
[52] U.S. Cl. ............................ 179/18 EB; 370/110.3
[58] Field of Search ......... 179/18 EB, 18 ES, 16 EC, 179/18 J; 370/110.3, 110.1, 58, 14

[56] References Cited

U.S. PATENT DOCUMENTS

| | | | |
|---|---|---|---|
| 3,315,039 | 4/1967 | Gebhardt et al. | 179/18 ET |
| 3,941,938 | 3/1976 | Gauthier | 179/18 EB |
| 4,256,926 | 3/1981 | Pitroda et al. | 179/18 ES |
| 4,280,217 | 7/1981 | Hafer et al. | 370/63 |
| 4,317,962 | 3/1982 | Cox et al. | 179/18 ES |

FOREIGN PATENT DOCUMENTS

2621603 11/1977 Fed. Rep. of Germany ... 370/110.1
2753364 5/1979 Fed. Rep. of Germany ... 179/18 EB Primary Examiner—Thomas W. Brown
Attorney, Agent, or Firm—K. H. Samples; R. T. Watland

[57] ABSTRACT

A dual tone multifrequency and dial pulse receiver that receives 8000 digital data words per second, each of the data words including eight PCM bits representing the analog signal transmitted from a subscriber set and also including a line status bit indicating the DC status of the line. The receiver includes a time-shared processor which processes the PCM bits of 4000 words per second to detect tone-pairs and which also processes the line status bit of 4000 words per second to detect valid dial pulse sequences. The time-shared processor stores one of a first plurality of code words in a register when a tone-pair is detected and stores one of a second plurality of code words in the register when a valid dial pulse sequence is detected. Advantageously, the receiver can detect either dual tone multifrequency or dial pulse signaling from a subscriber even though the type of signaling to be used by the subscriber is not known a priori.

17 Claims, 14 Drawing Figures

FIG. 1

| DIGIT | DTMF TONE-PAIRS FOR TOUCH-TONE® CALLING (FREQ IN Hz) | DTMF CODE |
|---|---|---|
| IDLE | | 0000 0000 |
| 0 | 941+1336 | 0010 1000 |
| 1 | 697+1209 | 0001 0001 |
| 2 | 697+1336 | 0010 0001 |
| 3 | 697+1477 | 0100 0001 |
| 4 | 770+1209 | 0001 0010 |
| 5 | 770+1336 | 0010 0010 |
| 6 | 770+1477 | 0100 0010 |
| 7 | 852+1209 | 0001 0100 |
| 8 | 852+1336 | 0010 0100 |
| 9 | 852+1477 | 0100 0100 |
| * | 941+1209 | 0001 1000 |
| # | 941+1477 | 0100 1000 |
| SPARE | 697+1633 | 1000 0001 |
| SPARE | 770+1633 | 1000 0010 |
| SPARE | 852+1633 | 1000 0100 |
| SPARE | 941+1633 | 1000 1000 |
| ABANDON | | 1010 1010 |

FIG. 2

| DIGIT | NUMBER OF PULSES | DP CODE |
|---|---|---|
| IDLE | 0 | 0000 0000 |
| 0 | 10 | 1101 0111 |
| 1 | 1 | 1110 1110 |
| 2 | 2 | 1101 1110 |
| 3 | 3 | 1011 1110 |
| 4 | 4 | 1110 1101 |
| 5 | 5 | 1101 1101 |
| 6 | 6 | 1011 1101 |
| 7 | 7 | 1110 1011 |
| 8 | 8 | 1101 1011 |
| 9 | 9 | 1011 1011 |
| FALSE | 11 | 1011 0111 |
| FALSE | 12 | 0111 1110 |
| FALSE | 13 | 0111 1101 |
| FALSE | 14 | 0111 1011 |
| FALSE | 15 | 0111 1011 |
| FIRST PULSE | | 0111 0111 |
| ABANDON | | 1010 1010 |

DUAL TONE MULTIFREQUENCY AND DIAL PULSE RECEIVER

TECHNICAL FIELD

This invention relates to signaling receivers and more particularly to such receivers used to receive dual tone multifrequency signaling and dial pulse signaling.

BACKGROUND OF THE INVENTION

Since dual tone multifrequency (DTMF) signaling and dial pulse signaling are both used widely to key customer originated calls, it is necessary that telephone switching systems be designed to allow either type of signaling. For example, many present day switching systems, such as direct progressive or step-by-step systems, are basically designed to establish switching connections in response to dial pulse signals. In order to enable such systems to operate with customer DTMF telephones, it is necessary to equip the systems with facilities for converting customer keyed DTMF signals into dial pulses.

An additional requirement is that although switching systems can be equipped to receive only dial pulse signaling from certain subscribers, they must be capable of receiving either DTMF or dial pulse signaling from other subscribers.

In one known digital switching system, channel circuits transmit sixteen-bit digital data words including eight pulse code modulation (PCM) bits and one line status bit. The eight PCM bits are a digital representation of the analog signal transmitted from the subscriber set and the line status bit indicates the DC state of the line. The system includes both DTMF receivers responsive to the PCM bits and dial pulse receivers responsive to the line status bit. The DTMF receivers process the PCM bits to detect tone-pairs. Each dial pulse receiver includes a signal processor which receives the line status bit and transmits a signal to a higher-level processor when a dial pulse has been received. In response to the signals from the signal processor, the higher-level processor determines when a valid sequence of properly timed dial pulses has been received. However, inclusion of the higher-level processor as part of the dial pulse receiver reduces the available real time of the higher-level processor for controlling other switching system functions. The present invention is a time-shared DTMF and dial pulse receiver which advantageously detects either DTMF or dial pulse signaling from a subscriber even though the type of signaling to be used by the subscriber is not known a priori and which operates without unnecessarily burdening a higher-level processor.

SUMMARY OF THE INVENTION

A receiver in accordance with the present invention is used to receive signaling from a telephone subscriber line. The receiver includes a sync pulse generator for generating sync pulses defining cycles each comprising a first time interval and a second time interval and apparatus for receiving digital data words during each of the first time intervals and the second time intervals. Each of the digital data words includes a first portion representing an analog signal on the line and a second portion representing a DC state of the line. The receiver further includes a detector responsive to the sync pulses and operative during the first time intervals for processing ones of the first portions of the digital data words to detect a plurality of tone-pairs on the line and operative during the second time intervals for processing ones of the second portions of the digital data words to detect a plurality of valid dial pulse sequences on the line.

BRIEF DESCRIPTION OF THE DRAWING

A more complete understanding of the present invention may be obtained from a consideration of the following description when read in conjunction with the drawing in which.

DETAILED DESCRIPTION

Figure 1:
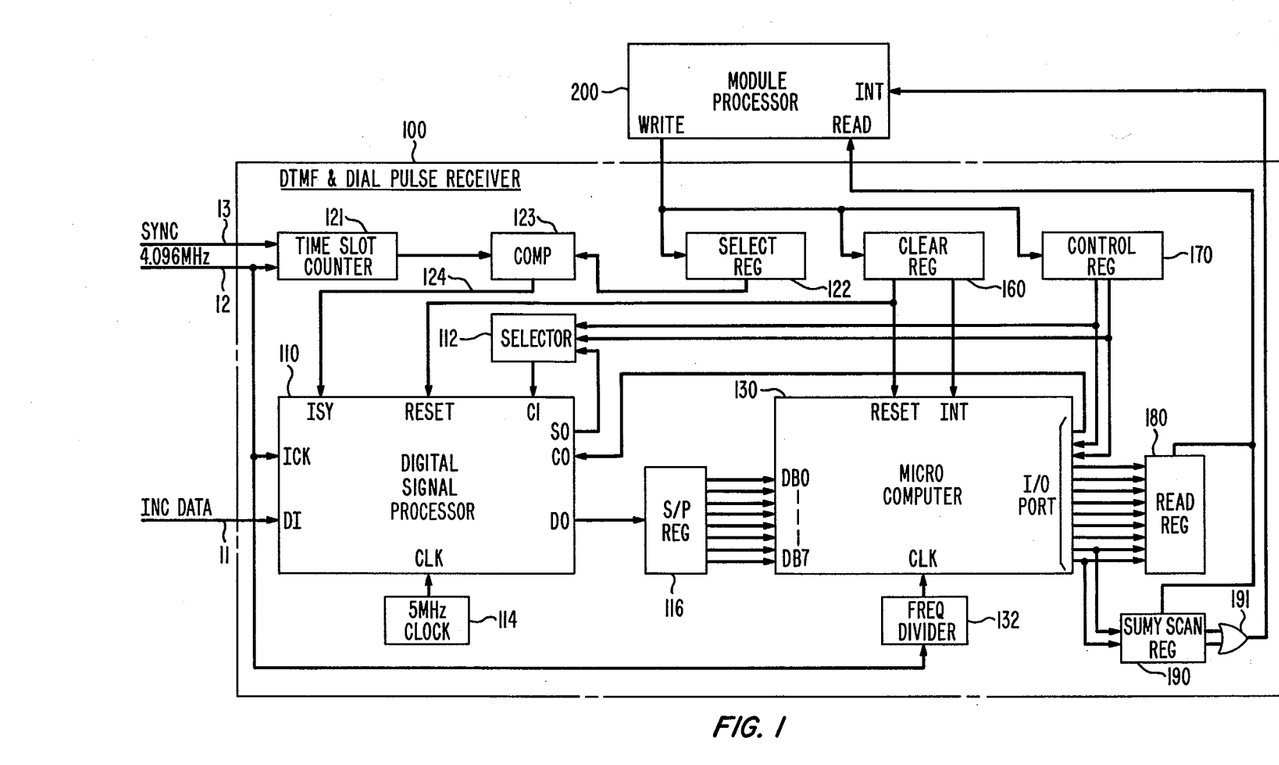
FIG. 1 is a block diagram of an embodiment of the present invention comprising a DTMF and dial pulse receiver and also including a module processor.

FIG. 1 is a block diagram of an embodiment of the present invention comprising a DTMF and dial pulse receiver 100. The diagram of FIG. 1 also shows a higher-level module processor 200 which, in addition to receiving digits from receiver 100 and controlling its operation, may be used to control numerous other functions of a time division switching system. Module processor 200 could for example be the processor 66 in the system disclosed in U.S. Pat. No. 4,296,492 issued to E. H. Hafer on Oct. 20, 1981. Receiver 100 may be included as part of the digital service unit 67 shown in FIG. 3 of the Hafer patent. Receiver 100 is connected to the following input lines from the switching system: (1) a 32-channel time-multiplexed line 11, (2) a 4.096-megahertz clock signal line 12 and (3) an 8-kilohertz sync line 13. Time-multiplexed line 11 is operative in 125-microsecond frames of 32 time slots and may, for example, be used to convey the information in 32 of the 512 time-slot interchanger channels of the system disclosed in the above-cited Hafer patent. Each of the time slots on time-multiplexed 11 contains a 16-bit digital data word including eight PCM bits and one line status bit. For each data word the PCM bits are generated according to the well-known $\mu$-255 encoding scheme from the analog signal transmitted from a subscriber set (not shown) and the line status bit indicates the DC state (on-hook or off-hook) of the line connected to that subscriber set. For DTMF signaling, a subscriber set transmits a digit by generating one of a plurality of tone-pairs. In accordance with the present example, the DTMF tone-pairs are those presently used for TOUCH-TONE calling as listed in FIG. 2. Dial pulse digits are transmitted as a certain number of pulses (FIG. 3) each comprising an off-hook/on-hook transition and an on-hook/off-hook transition. Accordingly DTMF signaling is transmitted via the PCM bits of the data words on line 11 and dial pulse signaling via the line status bits. The 4.096-megahertz clock signal on line 12 is in bit synchronism with the data words on time-multiplexed line 11 and may be derived, for example, from the bit stream transmitted by the time-multiplexed switching unit of the system disclosed in the above-cited Hafer patent. The 8-kilohertz sync pulses on line 13 coincide with the beginning of each frame on line 11.

Receiver 100 includes a time-slot counter 121 which receives the 4.096-megahertz clock signal on line 12 and the 8-kilohertz sync pulses on line 13 and generates a recurring sequence of 32 time-slot designations in synchronism with the 32 time slots of each frame on line 11. When module processor 200 determines that address signaling may be present in a given one of the time slots on line 11, it writes the time-slot designation of the given time slot in a select register 122. A comparator 123 compares the designations generated by time-slot counter 121 with the designation stored in select register 122 and generates a pulse on a conductor 124 when the two designations are identical. Accordingly, comparator 123 generates 8-kilohertz sync pulses on conductor 124 coinciding with the beginning of the given time slot of each frame. Receiver 100 also includes a detector comprising digital signal processor (DSP) 110, for example, the Western Electric F61329A digital signal processor described in the *Bell System Technical Journal*, Vol. 60, No. 7, part 2 of Sept. 1981, the internal configuration of which is shown at page 1451 thereof. After module processor 200 has written the given time-slot designation into select register 122, it initiates the operation of DSP 110 by writing a bit into a clear register 160, which is received, in turn, at a DSP 110 RESET input terminal. DSP 110 receives the 8-kilohertz sync pulses on conductor 124 at an ISY input terminal. After the receipt of a given sync pulse on line 124, the next data word present on line 11, which occurs in the time slot selected by module processor 200, is gated into an input buffer (not shown) of DSP 110 at a bit rate defined by the 4.096-megahertz clock signal on line 12. Accordingly, 8000 data words per second in the selected channel on line 11 will be gated into the input buffer of DSP 110. This corresponds to a rate of one data word every 125 microseconds. Although not shown in FIG. 1, input lines 11, 12 and 13 can be connected to as many as 32 receivers substantially identical to receiver 100 to detect address signaling in all 32 channels of line 11.

The programs for DSP 110 are stored in an internal read-only memory (ROM) (not shown) and their execution rate is defined by an external 5-megahertz clock 114. DSP 110 also includes an internal random access memory (RAM) (not shown) for storage. DSP 110 is programmed to operate in one of four modes. In Mode 0 the data words received by DSP 110 may contain either DTMF or dial pulse signaling while in Mode 2 only dial pulse signaling is allowed. Modes 1 and 3 are not relevant to the present invention and are not described herein. Module processor 200 determines the proper mode of operation in accordance with stored translation tables defining the type of address signaling allowed for each subscriber. Module processor 200 then writes two bits defining the proper mode into a control register 170. DSP 110 sequentially receives these bits at an input terminal C1 via a selector 112. Selector 112 selects one and then the other of the bits in accordance with a logic signal transmitted at a DSP 110 output terminal SO. For the present example, assume that module processor 200 defines the operating mode to be Mode 0, i.e., either DTMF or dial pulse signaling is allowed.

Recall that DSP 110 receives data words in the selected channel on line 11 at the rate of one data word every 125 microseconds. In Mode 0, DSP 110 operates in repetitive 250-microsecond cycles. During each cycle, two data words are received in sequence in the selected channel on line 11. The PCM bits of the first of the two data words are processed by a part of the DSP 110 program used to detect DTMF tone-pairs. Then the line status bit of the second of the two data words is processed by a part of the DSP 110 program used to detect dial pulse sequences. Once during each 250-microsecond cycle, DSP 110 serially transmits an eight-bit code word from an output terminal DO to a serial/parallel register 116 for storage. If neither DTMF or dial pulse signaling is detected, IDLE code word 00000000 representing an idle signaling condition on line 11 is stored in register 116. However if a DTMF digit is detected, the one of a first group of code words (FIG. 2) that corresponds to the detected digit is stored in register 116. Similarly, when a dial pulse digit is detected, one of a second group of code words (FIG. 3) is stored. The two groups are distinct so that dial pulse digits can be distinguished from DTMF digits. Since DSP 110 completes 40000 of these 250-microsecond cycles each second, 4000 words per second are processed to detect tone-pairs and 4000 words per second are processed to detect dial pulse sequences. (Since none of the tones to be detected exceeds 2 kilohertz, a sampling rate of 4000 samples per second is more than adequate for tone detection.) In Mode 0, either DTMF or dial pulse signaling can be detected, but as soon as a dial pulse is detected, the mode is changed to Mode 2 and no DTMF signaling can subsequently be detected.

Figure 4:
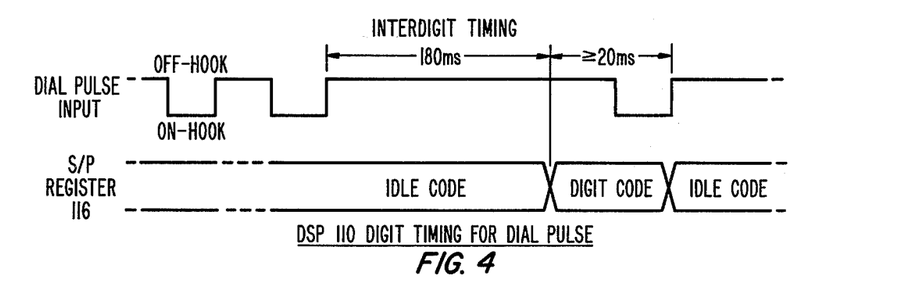
FIGS. 4, 5, 6, 7, 11 and 14 are timing diagrams relevant to the DTMF and dial pulse receiver of FIG. 1.
Figure 5:
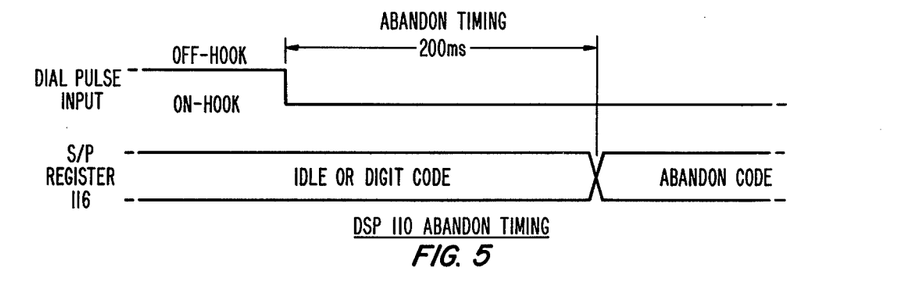
Figure 6:
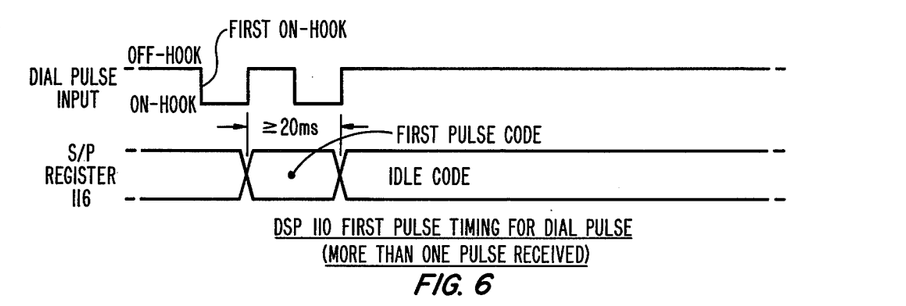
Figure 7:
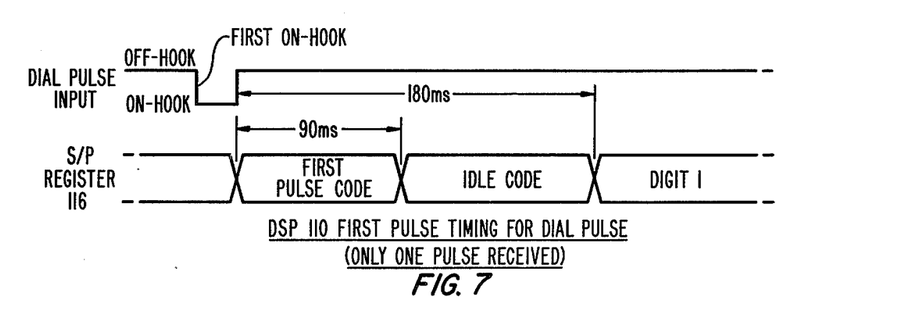

Although DSP 110 performs no timing functions with respect to DTMF digits it does implement certain timing functions to determine the receipt of a valid dial pulse sequence. Short-duration pulses are filtered out. A dial pulse digit is detected and the corresponding code word stored in serial/parallel register 116 when at least one dial pulse followed by a steady off-hook condition of at least 180 milliseconds is received (FIG. 4). When a steady on-hook condition is received for more than 200 milliseconds, call abandonment is assumed and an ABANDON code word 10101010 is stored in register 116 (FIG. 5). A FIRST PULSE code word 01110111 is stored in register 116 to indicate the receipt of the first dial pulse of a dial pulse sequence. This indication is needed so that dial tone can be promptly removed when a customer begins dialing. The FIRST PULSE code word is replaced with the IDLE code word after the second pulse of the sequence is received (FIG. 6) or, if only one pulse is received, after the off-hook condition remains for 90 milliseconds (FIG. 7). Receiver 100 is used to detect call abandonment during the address signaling portion of a call even though DTMF signaling is being received.

Recall that DSP 110 transmits a code word to register 116 every 250 microseconds. In accordance with the signaling rate standards for DTMF signaling, identical code words corresponding to a single DTMF digit must be transmitted to register 116 over a time period of at least 20 milliseconds. Further, IDLE code words must be transmitted to register 116 over a time period of at least 23 milliseconds between DTMF digits. Since dial pulse signaling is much slower than DTMF signaling, the time that identical code words corresponding to a dial pulse digit are transmitted to register 116 will also exceed 20 milliseconds and the time that identical IDLE code words are transmitted between dial pulse digits will similarly exceed 23 milliseconds.

Receiver 100 includes a microcomputer 130, for example the Intel 8048 described in the Intel publication

*MCS-40 Family of Single Chip Microcomputers User's Manual of 1979.* Microcomputer 130 performs a timing validation function by collecting only those digits meeting the above-mentioned timing requirements. The same bit that is written by module processor 200 into clear register 160 to initiate the operation of DSP 110 is received at a RESET input terminal of microcomputer 130 to begin its operation. The programs for microcomputer 130 are stored in an internal ROM (not shown) and their execution rate is defined by a 2.048-megahertz clock signal derived by a frequency divider 132 from the 4.096-megahertz clock signal on line 12. Similar to DSP 110, microcomputer 130 is programmed to operate in one of four modes selected by receiving at two input terminals of an I/O port the same two bits in control register 170 used for mode selection by DSP 110. To verify that the proper mode/selection bits have been received by microcomputer 130, the received bits are "echoed", i.e. transmitted via two output terminals of the I/O port to a read register 180 to be read by module processor 200. Recall that for the present example, Mode 0 is assumed and receiver 100 can receive either DTMF or dial pulse signaling.

Figure 2:
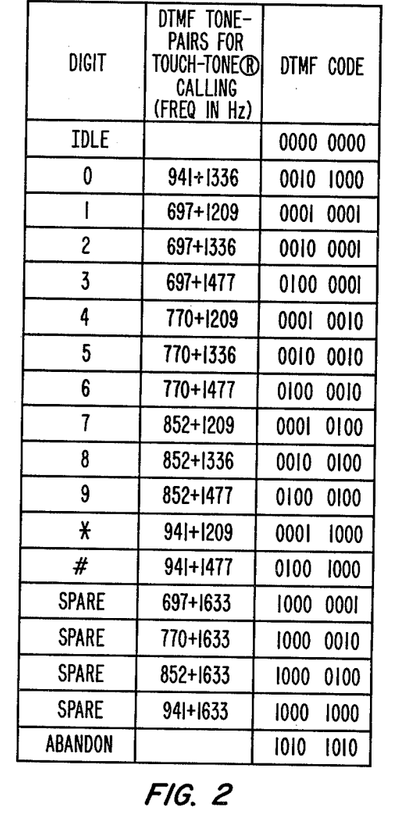
FIGS. 2 and 3 are code word tables used by the DTMF and dial pulse receiver of FIG. 1.
Figure 3:
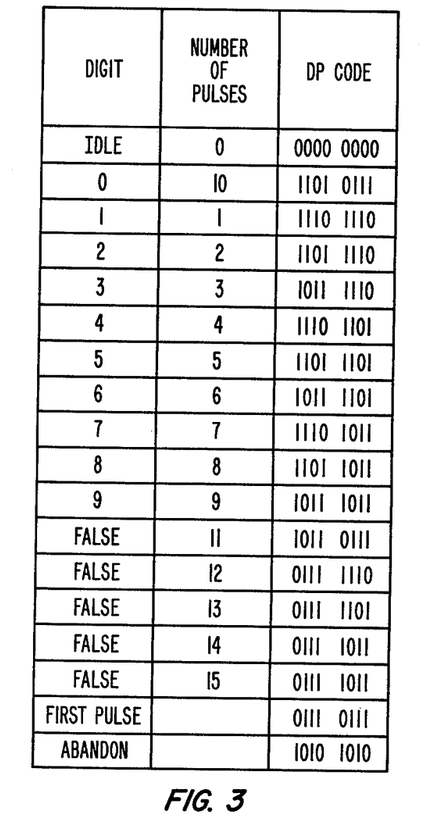

Microcomputer 130 repetitively reads the contents of serial/parallel register 116 via eight input terminals DB0 through DB7. To prevent DSP 110 from changing the contents of serial/parallel register 116 while microcomputer 130 is reading them, an inhibit signal is transmitted from an output terminal of the microcomputer 130 I/O port to a DSP 110 input terminal CO. Microcomputer 130 uses an internal hardware timer (not shown) under program control to determine when a code word representing a DTMF or dial pulse digit has been present in register 116 for 20 milliseconds following the presence of the IDLE code word for at least 23 milliseconds. Microcomputer 130 also determines whether the code word in register 116 represents a DTMF digit (FIG. 2) or a dial pulse digit (FIG. 3). When microcomputer 130 determines that a properly timed digit has been received, it places a four-bit code word representing that digit in a software first-in/first-out (FIFO) buffer implemented via an internal RAM (not shown). The first code word stored in the FIFO buffer is immediately stored in four bit positions of read register 180. As additional digits are received, code words representing them are placed in consecutive order in the FIFO buffer. Three bits of read register 180 referred to as the digit present bit, the signaling type bit and the abandon bit are used respectively to indicate (1) whether a digit-representing code word is present to be read by module processor 200, (2) whether the signaling is DTMF or dial pulse and (3) whether the call has been abandoned. A logic one is stored as the digit present bit when a digit-representing code word is present to be read by module processor 200 and a logic one is stored as the abandon bit when the call is abandoned. The digit present bit and the abandon bit are stored in a summary scan register 190. If the digit present bit indicates that there is a code word to be read in read register 180 or if the abandon bit indicates that the call has been abandoned, an OR gate 191 transmits an interrupt signal to module processor 200. In response to this interrupt signal, module processor 200 reads the contents of read register 180. When the reading operation is completed, module processor 200 writes a bit into clear register 160 which is received at an INT input terminal of microcomputer 130. In response, the contents of the FIFO buffer are shifted and the code word representing the second received digit is stored in read register 180. This process repeats until all digits stored in the FIFO buffer have been read by module processor 200.

Figure 8:
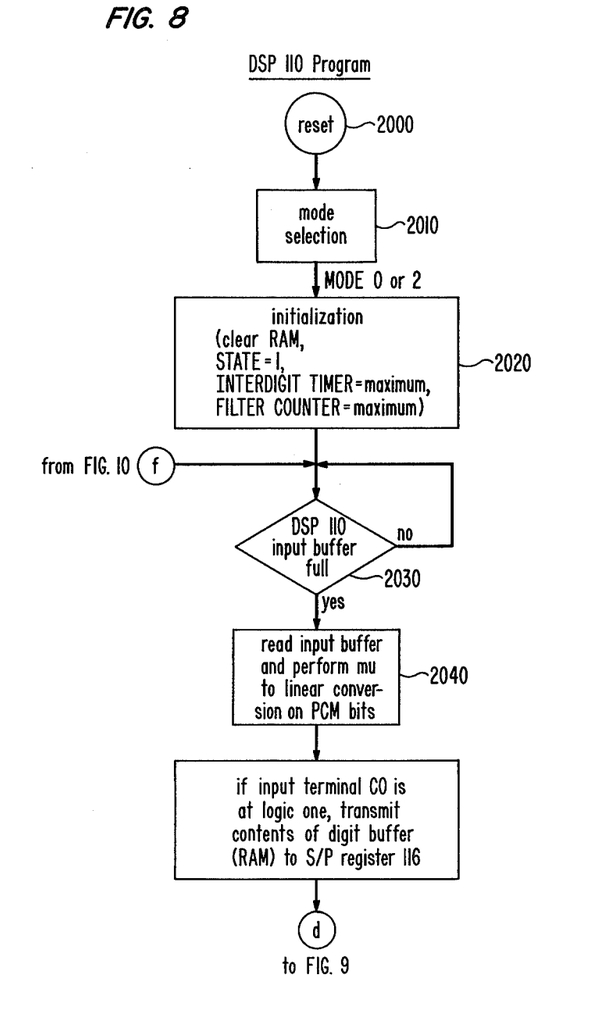
FIGS. 8, 9, and 10 represent a program flow chart for a digital signal processor included in the DTMF and dial pulse receiver of FIG. 1.

The operation of DSP 110 can be better understood by a consideration of the program flow chart shown in FIGS. 8, 9 and 10. At block 2000 DSP 110 receives a bit at its RESET input terminal to begin operation. During block 2010 the mode selection bits are read from control register 170. The mode selected is stored as a variable MODE. If either Mode 0 or Mode 2 is selected, initialization block 2020 is executed wherein variables FILTER COUNTER and INTERDIGIT TIMER are set to maximum values and a variable STATE is set to one. Other variables are set to zero as the internal RAM is cleared. The variable INTERDIGIT TIMER is used to determine a continuous off-hook condition of 180 milliseconds duration. During block 2030 the input buffer of DSP 110 is checked to determine whether a 16-bit digital data word has been received. If not, block 2030 is repeated until such a word has been received. The PCM bits of a received data word are converted from $\mu$-255 coding to linear coding during block 2040. During block 2050 the contents of a software digit buffer implemented in RAM are transmitted to serial/parallel register 116 if input terminal CO is at logic one. (Microcomputer 130 transmits a logic zero to input terminal CO when it is reading register 116.) During the first execution of block 2050 the digit buffer will be empty but during subsequent cycles it will contain the 8-bit code words stored when DTMF or dial pulse signaling is detected. If the operating mode is Mode 0 execution proceeds from decision block 2060 to a DTMF receiver subprogram 2100. Subprogram 2100, to be described herein, generates one of the 8-bit code words of FIG. 2 and stores that code word as a variable NEW1. In decision block 2200 the code word stored as the variable NEW1 is compared with a variable OLD1, which represents a previously stored code word. If the variables NEW1 and OLD1 are not equal, the variable OLD1 and the software digit buffer are updated with the variable NEW1. At this point processing of one 16-bit data word has been completed and execution proceeds to block 2220. In block 2220 the input buffer of DSP 110 is again checked to determine whether a second data word has been received. This sets the rate of system operation since DSP 110 receives one data word every 125 microseconds. When the second data word is received, the line status bit of that word is extracted during block 2230 for processing by a dial pulse receiver subprogram 2300. Subprogram 2300, to be described herein, includes a timing routine using the variable FILTER COUNTER and upper and lower threshold values so that short-duration pulses on line 11 are not improperly detected as dial pulses. During the execution of dial pulse receiver subprogram 2300, an 8-bit code word may be stored as a variable NEW2 and execution proceeds to block 2400. If the variable NEW2 and a variable OLD2 are not equal, the variable OLD2 and the software digit buffer are updated with the variable NEW2. At this point processing of the second data word received on line 11 is completed and operation returns to block 2030 where the input buffer is checked to determine whether a third data word has been received. During the operation of one 250-microsecond cycle, one data word received by the input buffer is processed by DTMF receiver subprogram 2100 and one data word is processed by dial pulse receiver subprogram 2300. Once during each 250-microsecond cycle the contents of the digit buffer are transmitted to serial/parallel register 116 during block 2050. If for some reason both DTMF and dial pulse signaling were received during a given cycle, only the code word stored during dial pulse receiver subprogram 2300 would be transmitted to register 116.

Figure 9:
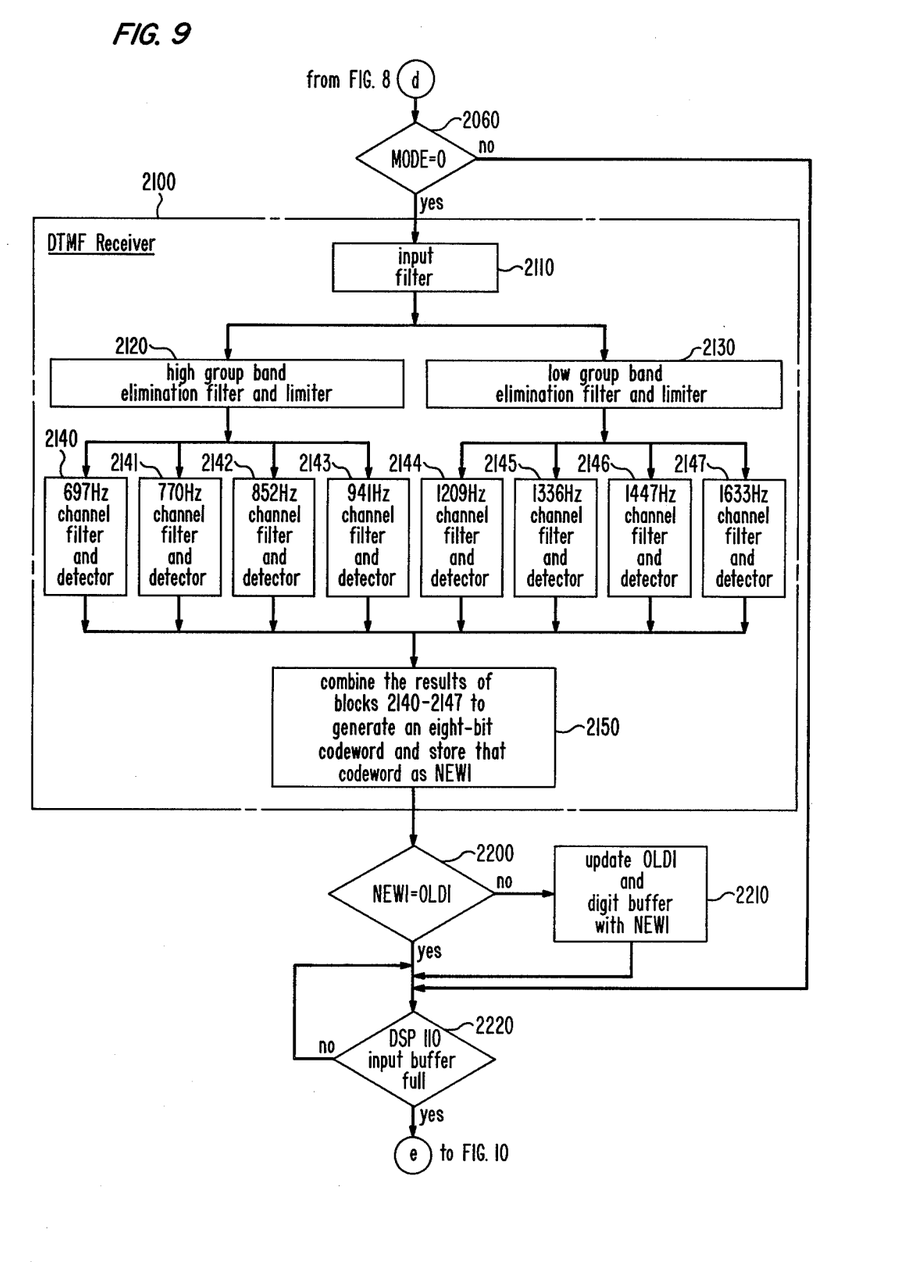

The operation of DTMF receiver subprogram 2100 (FIG. 9) can be better understood by a consideration of its function in the frequency domain rather than the time domain. The linear PCM bits are received by input filter block 2110 which operates to filter out any signal content comprising the 60-hertz power frequency, harmonics thereof and dial tone. High group band elimination filter and limiter block 2120 acts to filter out high frequency tones and to limit signals having two or more low frequency components. Similarly low group band elimination filter and limiter block 2130 filters out low frequency tones and limits signals having two or more high frequency components. Eight blocks 2140–2147 are used to detect the individual tones. During block 2150 the results of the eight blocks 2140–2147 are combined to generate an 8-bit code word stored as the variable NEW1. The operation of DSP 110 as a DTMF receiver is further described in the above-cited issue of the *Bell System Technical Journal.*

Figure 10:
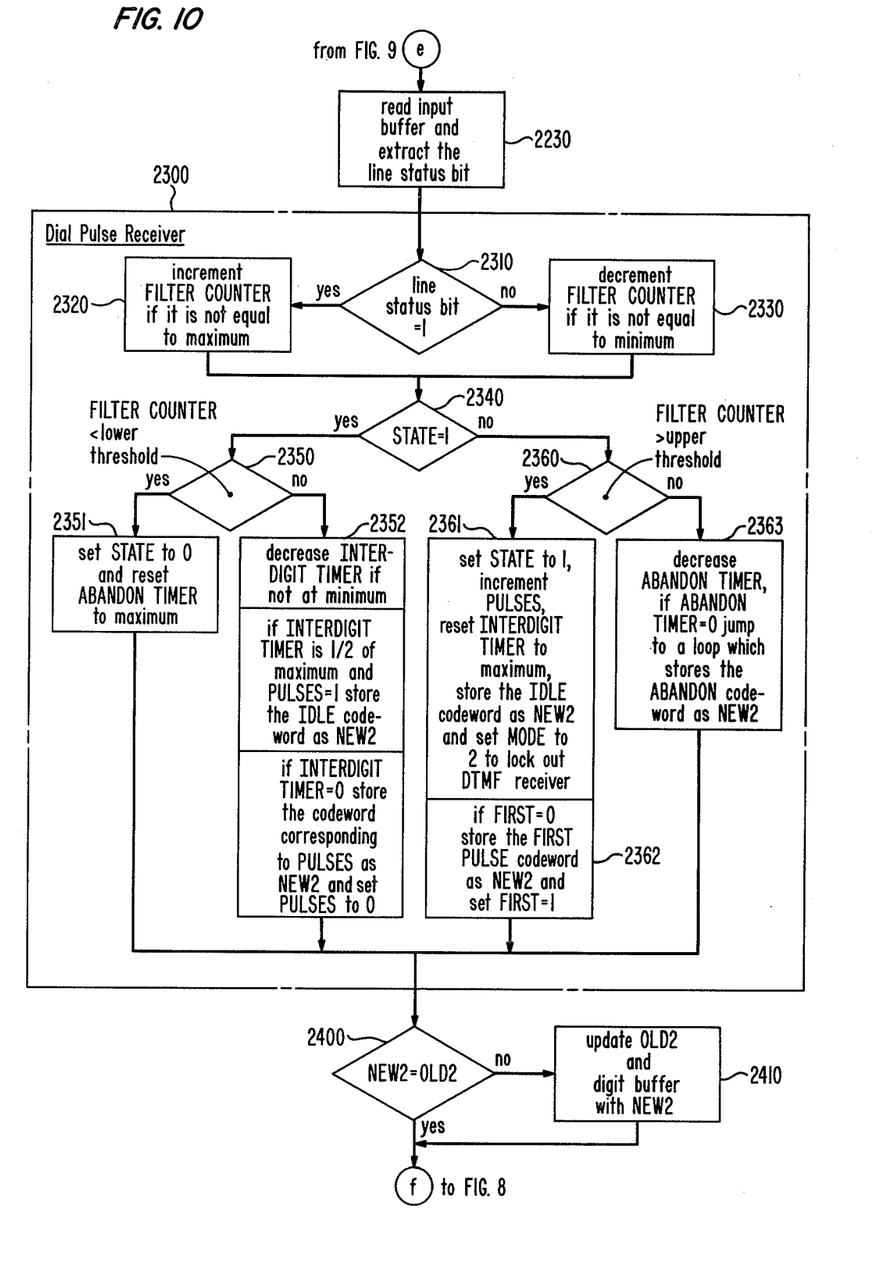
Figure 11:
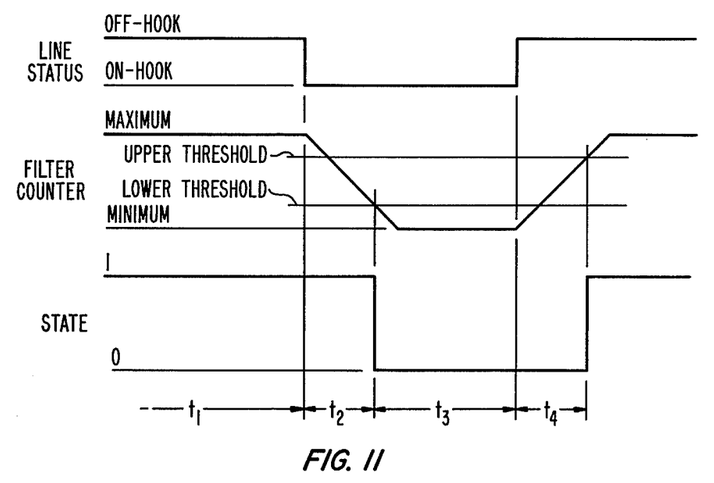

The operation of dial pulse receiver subprogram 2300 (FIG. 10) is described with respect to the timing diagram shown in FIG. 11. FIG. 11 shows a single dial pulse represented by one off-hook to on-hook transition and one on-hook to off-hook transition on the line and defines time periods $t_1$, $t_2$, $t_3$, and $t_4$ with respect thereto. During each occurrence of block 2310, the line status bit is tested. During time $t_1$ (FIG. 11) the line status is off-hook as indicated by a line status bit of one and execution of block 2310 results in a branch to block 2320. During block 2320 the variable FILTER counter may be incremented. However, since the variable FILTER COUNTER was set to its maximum value during initialization block 2020, it is not further incremented during block 2320. The variable STATE is used to represent the line status detected by dial pulse receiver subprogram 2300 with any short-duration pulses filtered out. During block 2340 the variable STATE is tested. Since STATE was initialized to one during block 2020 corresponding to an initial off-hook condition on the line, execution proceeds to block 2350 where the variable FILTER COUNTER is tested against the lower threshold value (FIG. 11). Since the variable FILTER COUNTER is set at a maximum value execution proceeds to block 2352 and the variable INTERDIGIT TIMER is decreased. The sequence comprising blocks 2310, 2320, 2340, 2350 and 2352 is followed during each execution of dial pulse receiver subprogram 2300 for the remainder of the time $t_1$ until the line status changes to on-hook. If any execution of block 2352 results in the variable INTERDIGIT TIMER being reduced to zero indicating a continuous off-hook condition on the line for more than 180 milliseconds, a code word corresponding to the value of a variable PULSES (see FIG. 3) is stored as the variable NEW2 and the variable PULSES is reset to zero. The variable PULred as the variable NEW2 (FIG. 7). This allows the FIRST PULSE code word and the code word representing the dial pulse digit "1" to be separated by the IDLE code word for more than 23 milliseconds to meet the timing requirements imposed by microcomputer 130.

After the line status has changed to on-hook at the end of time $t_1$, the next execution of block 2310 results in a branch to block 2330 during which the variable FILTER COUNTER is decremented. Until the variable FILTER COUNTER reaches the lower threshold value (FIG. 11), i.e., the remainder of the time $t_2$, the sequence comprising blocks 2310, 2330, 2340, 2350 and 2352 is followed. The result of the first execution of block 2350 for which the variable FILTER COUNTER is less than the lower threshold value is a branch to block 2351 during which the variable STATE is set to zero indicating the detected on-hook status of the line and a variable ABANDON TIMER is reset to a maximum value. The variable ABANDON TIMER is used to determine a continuous on-hook condition of 200 milliseconds duration. Since the variable STATE has been set to zero, the result of the next execution of block 2340 is a branch to decision block 2360. Since the variable FILTER COUNTER is not greater than the upper threshold value (FIG. 11), block 2363 is executed wherein the variable ABANDON TIMER is decreased. During the remainder of the time $t_3$ the sequence comprising blocks 2310, 2330, 2340, 2360 and 2363 is repetitively executed. If at any time execution of block 2363 results in the variable ABANDON TIMER being reduced to zero indicating a continuous on-hook condition on the line for more than 200 milliseconds, execution branches to a loop wherein the ABANDON code word is stored as the variable NEW2 and DSP 110 will be unable to receive further signaling until being reset by module processor 200. When the line status changes to off-hook at the end of time $t_3$, execution of block 2310 results in a branch to block 2320 wherein the variable FILTER COUNTER is incremented. During time $t_4$ the sequence comprising blocks 2310, 2320, 2340, 2360 and 2363 is repetitively executed. The result of the first execution of block 2360 having the variable FILTER COUNTER greater than the upper threshold value is a branch to block 2361 wherein the variable STATE is set to one, the variable PULSES is incremented, the variable INTERDIGIT TIMER is reset to a maximum value, the IDLE code word is stored as the variable NEW2 and the variable MODE is set to two to lock out DTMF receiver subprogram 2100. If a variable FIRST equals zero indicating the detection of the first dial pulse of a dial pulse sequence, execution of block 2362 results in the FIRST PULSE code word being stored as the variable NEW2 and the variable FIRST is then set to one. The variable FIRST is used as a flag such that the FIRST pulse code word is transmitted for the first dial pulse digit only. Since the variable STATE has been set to one, the result of the next execution of block 2340 is a branch to block 2350 and the sequence of operations repeats as DSP 110 waits for a second dial pulse to be received. Recall that after the final dial pulse of a dial pulse sequence is received, as indicated by the variable INTERDIGIT TIMER being reduced to zero during block 2352, the code word corresponding to the value of the variable PULSES is stored as the variable NEW2 to be transmitted to serial/parallel register 116.

Figure 12:
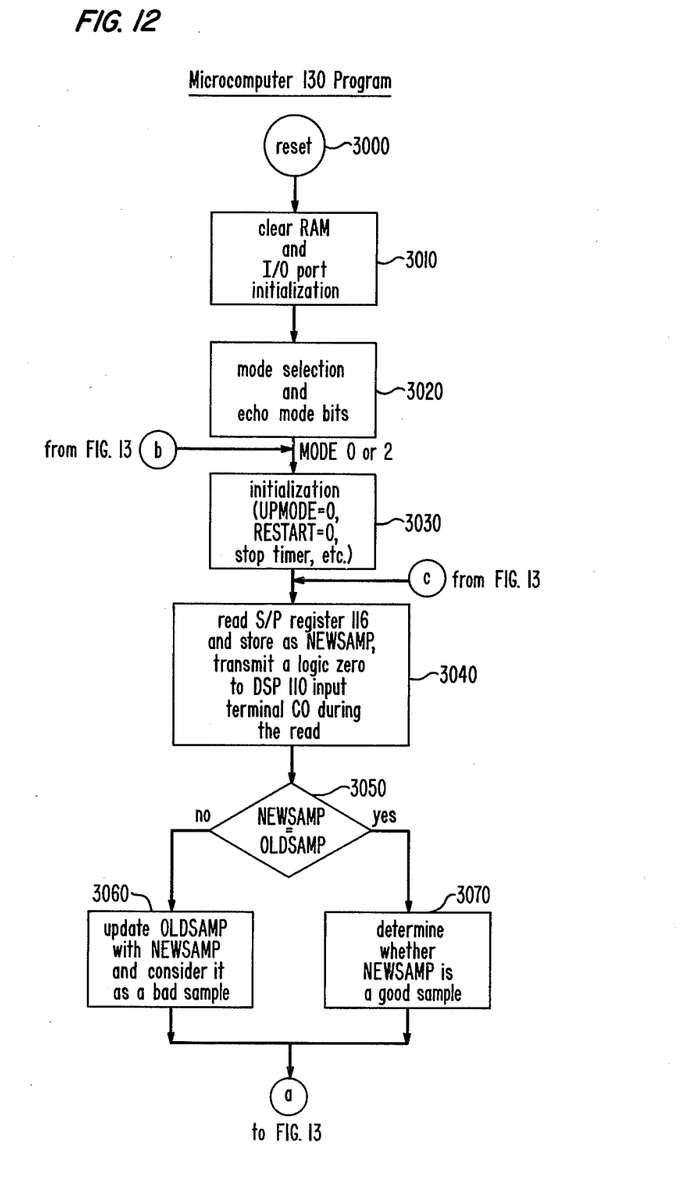
FIGS. 12 and 13 represent a program flow chart for a microcomputer included in the DTMF and dial pulse receiver of FIG. 1.
Figure 13:
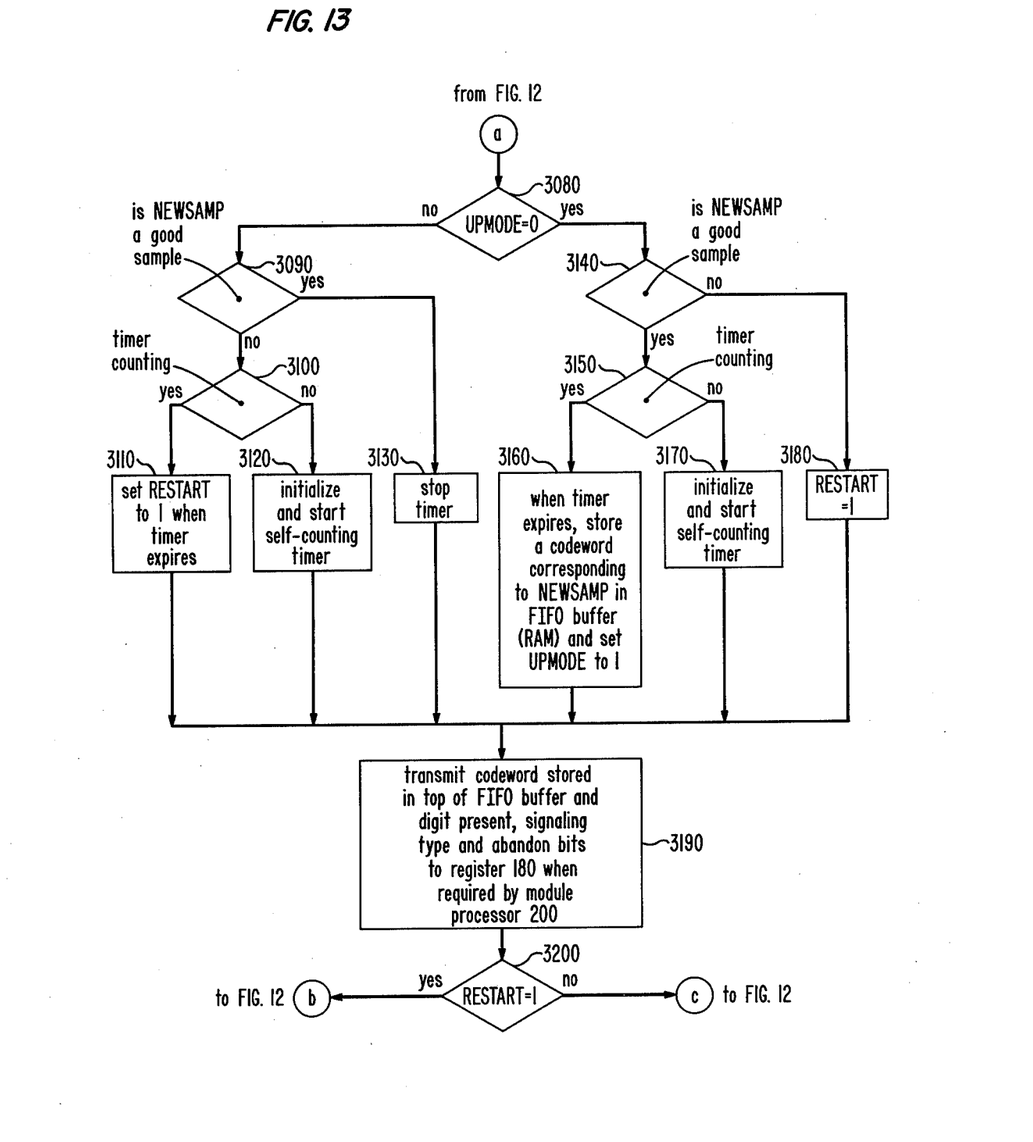
Figure 14:
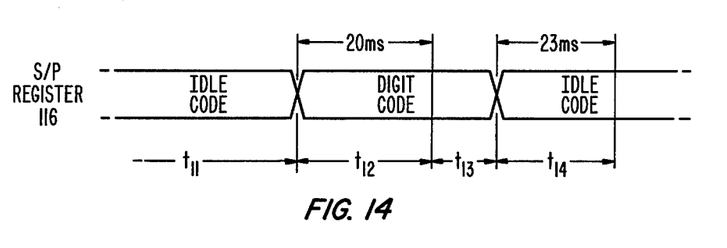

The program flow chart for microcomputer 130 is shown in FIGS. 12 and 13 and will be explained with reference to the timing diagram of FIG. 14. Operation is initiated during block 3000 when the RESET bit is received from clear register 160. During block 3010 the internal RAM and the I/O port are initialized. The mode selection bits are received from control register 170 during block 3020 and those bits are echoed to read register 180. Assuming Mode 0 or Mode 2 has been selected, execution continues with block 3030 during which two variables UPMODE and RESTART are set to zero and the internal hardware timer is stopped. Microcomputer 130 is used to implement the requirement that identical code words corresponding to a single DTMF or dial pulse digit (or the ABANDON or FIRST PULSE code words) must be transmitted to register 116 for at least 20 milliseconds and that identical IDLE code words (or identical illegal code words not listed in FIG. 2 or 3) must be transmitted for at least 23 milliseconds between digits. The variables UPMODE and RESTART are used to change the sequence of program steps executed by microcomputer 130 to implement this timing validation function. The 8-bit code word stored in serial/parallel register 116 is read and stored as a variable NEWSAMP during block 3040. During the reading of register 116, a logic zero is transmitted to DSP 110 input terminal CO to prevent DSP 110 from changing the contents of register 116. At decision block 3050 the variable NEWSAMP is compared with a variable OLDSAMP representing a previously stored code word. If the variables NEWSAMP and OLDSAMP are not identical, execution proceeds to block 3060 and the variable OLDSAMP is updated with the variable NEWSAMP, but the variable NEWSAMP is considered as a bad sample. (This prevents a single erroneous sample from interfering with the timing validation function.) If the variables NEWSAMP and OLDSAMP are identical, execution proceeds to block 3070 wherein a routine is run to determine whether the variable NEWSAMP represents a good sample defined as one of the code words representing either a DTMF or dial pulse digit, the FIRST PULSE code word or the ABANDON code word as shown in FIGS. 2 and 3. The IDLE code word is considered as a bad sample. The distinction between good and bad samples is used to characterize whether the code words stored in register 116 represent DTMF or dial pulse digits (or are the ABANDON or FIRST PULSE code words) or represent interdigit IDLE code words (or illegal code words). Refer to FIG. 14 which defines time periods $t_{11}$, $t_{12}$, $t_{13}$, and $t_{14}$ with respect to the time sequence associated with serial/parallel register 116 having first the IDLE code word, then a code word representing a digit and then the IDLE code word stored therein. The IDLE code word is present in serial/parallel register 116 during time $t_{11}$ At decision block 3080 the variable UPMODE is tested and since the variable UPMODE was initially set to zero during block 3030, execution proceeds to decision block 3140 wherein the variable NEWSAMP is tested. Since the variable NEWSAMP represents a bad sample, in this case the IDLE code word, execution continues to block 3180 during which the variable RESTART is set to one. Since no digit (or ABANDON or FIRST PULSE code word) has been received, nothing is transmitted to register 180 during block 3190 and execution proceeds to decision block 3200. Since the variable RESTART has been set to one, execution is routed back to initialization block 3030. During the remainder of the time $t_{11}$ microcomputer 130 is waiting for a good sample to be present in serial/parallel register 116 and the sequence comprising blocks 3030, 3040, 3050, 3070, 3080, 3140, 3180, 3190 and 3200 is repeated. After a code word representing a digit or the FIRST PULSE or ABANDON code word is stored in serial/parallel register 116, the second subsequent execution of decision block 3140 results in a branch to decision block 3150 since a good sample is present. During block 3150, a determination is made of whether the hardware timer has been started. Since the hardware timer was stopped during initialization block 3030 the result of decision block 3150 is a branch to block 3170 wherein the timer is initialized and started and execution proceeds to block 3190. Nothing is transmitted to register 180 during block 3190 and execution proceeds to block 3200. Since the variable RESTART is zero, the result of decision block 3200 is a branch back to block 3040. (Note that initialization block 3030 is not executed.) Execution proceeds through blocks 3050, 3070, 3080, and 3140 as before to block 3150. Since the timer has now been started, the result of decision block 3150 is a branch to block 3160. During the remainder of the time $t_{12}$, the sequence comprising blocks 3040, 3050, 3070, 3080, 3140, 3150, 3160, 3190, and 3200 is repeated. When the hardware timer indicates that a good sample has been present in serial/parallel register for 20 milliseconds, a four-bit code word representing the variable NEWSAMP is stored in the FIFO buffer and the variable UPMODE is set to one. The first such four-bit code word stored in the FIFO buffer is immediately transmitted to register 180. The digit present, abandon, and signaling type bits are also transmitted to register 180. During block 3190 a subsequent code word stored in the FIFO buffer may be transmitted to register 180 along with the digit present, abandon, and signaling type bit when module processor 200 indicates by setting a bit in clear register 160 that it is ready to read another word and that indication is received by microcomputer 130. The variable UPMODE has been set to one so the result of the first execution of decision block 3080 during $t_{13}$ will be a branch to decision block 3090. In accordance with the present example a good sample is present in serial/parallel register 116 for more than 20 milliseconds (FIG. 14) and the result of decision block 3090 is a further branch to block 3130 wherein the hardware timer is stopped. Since the variable RESTART is zero, operation during time $t_{13}$ will follow the sequence comprising blocks 3040, 3050, 3070, 3080, 3090, 3130, 3190, and 3200. However, when the good sample in serial/parallel register 116 is replaced with the IDLE code word at the end of time $t_{13}$ the result of decision block 3090 is a branch to decision block 3100. Since the hardware timer has been stopped, block 3120 will be executed to initialize and start the timer. For subsequent cycles during time $t_{14}$ the result of decision block 3100 will be a branch to block 3110 and the sequence comprising blocks 3040, 3050, 3070, 3080, 3090, 3100, 3110, 3190, and 3200 is repeated. When the hardware timer indicates that the IDLE code word has been present in serial/parallel register 116 for 23 milliseconds, the variable RESTART is set to one in block 3110. The result of the next execution of decision block 3200 is a branch to block 3030 and operation will continue as microcomputer 130 waits for the presence of another good sample in serial/parallel register 116.

It is to be understood that the above-described embodiment is merely descriptive of the principles of the invention and that other embodiments may be devised by those skilled in the art without departing from the spirit and scope of the invention.

What is claimed is:

1. A receiver for receiving signaling from a telephone subscriber line comprising means for generating sync pulses defining recurring cycles each comprising a first time interval and a second time interval, means for receiving digital data words during each of said first time intervals and said second time intervals, each of said digital data words including a first portion representing an analog signal on said line and a second portion representing a DC state of said line and detector means responsive to said sync pulses comprising time-shared means operative during said first time intervals for processing ones of said first portions of said digital data words to detect a plurality of tone-pairs on said line and operative during said second time intervals for processing ones of said second portions of said digital data words to detect a plurality of valid dial pulse sequences on said line.

2. A receiver in accordance with claim 1 wherein said detector means further comprises transmitter means coupled to said time-shared means for transmitting one of a first plurality of code words when a corresponding one of said plurality of tone-pairs is detected by said time-shared means, for transmitting one of a second plurality of code words when corresponding one of said plurality of valid dial pulse sequences is detected by said time-shared means and for transmitting an IDLE code word when an idle status of said line is detected by said time-shared means.

3. A receiver in accordance with claim 2 further comprising register means coupled to said transmitter means for storing each code word transmitted by said transmittter means for at least a predetermined duration after the transmission of that code word by said transmitter means.

4. A receiver in accordance with claim 3 further comprising timing validation means comprising reading means for repetitively reading said register means and means coupled to said reading means for generating and storing a given one of a third plurality of code words when said reading means has repetitively read for at least a first fixed time period only identical code words not being included in a group of code words comprising said first and second pluralities of code words after which said reading means has repetitively read for at least a second fixed time period only identical code words each being one code word of said group of code words, said one code word of said group of code words being associated with said given one of said third plurality of code words.

5. A receiver in accordance with claim 1 wherein said time-shared means is further operative during said second time intervals for processing said ones of said second portions of said digital data words to detect a call abandoned status of said line.

6. A receiver in accordance with claim 5 wherein said detector means further comprises transmitter means coupled to said time-shared means for transmitting one of a first plurality of code words when a corresponding one of said plurality of tone-pairs is detected by said time-shared means, for transmitting one of a second plurality of code words when a corresponding one of said plurality of valid dial pulse sequences is detected by said time-shared means, for transmitting an ABANDON code word when said call abandoned status is detected by said time-shared means and for transmitting an IDLE code word when an idle status of saidline is detected by said time-shared means.

7. A receiver in accordance with claim 6 further comprising register means coupled to said transmitter means for storing each code word transmitted by said transmitter means for at least a predetermined duration after the transmission of that code word by said transmitter means.

8. A receiver in accordance with claim 7 further comprising timing validation means comprising reading means for repetitively reading said register means and means coupled to said reading means for generating and storing a given one of a third plurality of code words when said reading means has repetitively read for at least a first fixed time period only identical code words not being included in a group of code words comprising said first and second pluralities of code words and said ABANDON code word after which said reading means has repetitively read for at least a second fixed time period, only identical code words each being one code word of said group of code words, said one code word of said group of code words being associated with said given one of said third plurality of code words.

9. A receiver in accordance with claim 5 wherein said time-shared means is further operative during said second time intervals for processing said ones of said second portions of said digital data words to detect a first dial pulse on said line.

10. A receiver in accordance with claim 9 wherein said detector means further comprises transmitter means coupled to said time-shared means for transmitting one of a first plurality of code words when a corresponding one of said plurality of tone-pairs is detected by said time-shared means, for transmitting one of a second plurality of code words when a corresponding one of said plurality of valid dial pulse sequences is detected by said time-shared means, for transmitting an ABANDON code word when said call abandoned status is detected by said time-shared means, for transmitting a FIRST PULSE code word when said first dial pulse is detected by said time-shared means and for transmitting an IDLE code word when an idle status of said line is detected by said time-shared means.

11. A receiver in accordance with claim 10 further comprising register means coupled to said transmitter means for storing each code word transmitted by said transmitter means for at least a predeterminmed duration after the transmission of that code word by said transmitter means.

register means for storing for one of said cycles each of the code words transmitted by said transmitter means.

12. A receiver in accordance with claim 11 further comprising timing validation means comprising reading means for repetitively reading said register means and means coupled to said reading means for generating and storing a given one of a third plurality of code words when said reading means has repetitively read for at least a first fixed time period only identical code words not being included in a group of code words comprising said first and second pluralities of code words, said ABANDON code word and said FIRST PULSE code word after which said reading means has repetitively read for at least a second fixed time period only identical code words each being one code word of said group of code words, said one code word of said group of code words being associated with said given one of said third plurality of code words.

13. A receiver in accordance with claim 9 wherein said detector means further comprises means for disabling said time-shared means from processing said ones of said first portions of said digital data words after said first dial pulse has been detected.

14. A receiver in accordance with claim 13 wherein said detector means further comprises transmitter means coupled to said time-shared means for transmitting one of a first plurality of code words when a corresponding one of said plurality of tone-pairs is detected by said time-shared means, for transmitting one of a second plurality of code words when a corresponding one of said plurality of valid dial pulse sequences is detected by said time-shared means, for transmitting an ABANDON code word when said call abandoned status is detected by said time-shared means, for transmitting a FIRST PULSE code word when said first dial pulse is detected by said time-shared means and for transmitting an IDLE code word when an idle status of said line is detected by said time-shared means.

15. A receiver in accordance with claim 14 further comprising register means coupled to said transmitter means for storing each code word transmitted by said transmitter means for at least a predetermined duration after the transmission of that code word by said transmitter means.

16. A receiver in accordance with claim 15 further comprising timing validation means comprising reading means for repetitively reading said register means and means coupled to said reading means for generating and storing a given one of a third plurality of code words when said reading means has repetitively read for at least a first fixed time period only identical code words not being included in a group of code words comprising said first and second pluralities of code words, said ABANDON code word and said FIRST PULSE code word after which said reading means has repetitively read for at least a second fixed time period only identical code words each being one code word of said group of code words, said one code word of said group of code words being associated with said given one of said third plurality of code words.

17. A receiver in accordance with claim 4, 8, 12 or 16 wherein each code word of said first and second pluralities of code words is unique and said timing validation means further comprises means for storing a bit having a first logic value when one of said first plurality of code words is read by said reading means and having a second logic value when one of said second plurality of code words is read by said reading means.

* * * * *

UNITED STATES PATENT AND TRADEMARK OFFICE
CERTIFICATE OF CORRECTION

PATENT NO. : 4,460,806

DATED : July 17, 1984

INVENTOR(S) : Ronald J. Canniff and Gordon K. Lin

It is certified that error appears in the above-identified patent and that said Letters Patent is hereby corrected as shown below:

Column 4, line 20, "40000" should be "4000";

Column 7, line 61, delete "PULred as the" and substitute
--PULSES represents the number of dial pulses detected by dial pulse receiver subprogram 2300. The variable INTERDIGIT TIMER will continue to be decreased until reaching a predetermined negative value. Another function achieved during block 2352 is that in the special case when the variable PULSES equals one and the variable INTERDIGIT TIMER is reduced to one-half of its maximum value indicating a continuous off-hook condition on the line for 90 milliseconds, the IDLE code word is stored as the--

Column 9, line 47, after "$t_{11}$" insert a period.

Column 11, line 26, after "when" insert --a--;

UNITED STATES PATENT AND TRADEMARK OFFICE
CERTIFICATE OF CORRECTION

PATENT NO. : 4,460,806
DATED : July 17, 1984
INVENTOR(S) : Ronald J. Canniff and Gordon K. Lin It is certified that error appears in the above-identified patent and that said Letters Patent is hereby corrected as shown below:

Column 12, line 5, "saidline" should be "said line";
Column 12, line 57, "predeterminmed" should be "predetermined";
Column 12, lines 60-62, delete in their entirety.

Signed and Sealed this

Thirtieth Day of October, 1990

*Attest:*

HARRY F. MANBECK, JR.

*Attesting Officer*     *Commissioner of Patents and Trademarks*